US012507201B2

(12) United States Patent
Villien

(10) Patent No.: US 12,507,201 B2
(45) Date of Patent: Dec. 23, 2025

(54) METHOD AND SYSTEM FOR LOCATING A MOBILE NODE BY RADIO MEASUREMENTS USING A VISIBILITY MAP

(71) Applicant: COMMISSARIAT A L'ENERGIE ATOMIQUE ET AUX ENERGIES ALTERNATIVES, Paris (FR)

(72) Inventor: Christophe Villien, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 373 days.

(21) Appl. No.: 18/201,087

(22) Filed: May 23, 2023

(65) Prior Publication Data

US 2023/0413224 A1 Dec. 21, 2023

(30) Foreign Application Priority Data

May 25, 2022 (FR) ..................................... 2205042

(51) Int. Cl.
*H04W 64/00* (2009.01)
*G01S 5/02* (2010.01)
(52) U.S. Cl.
CPC .......... *H04W 64/006* (2013.01); *G01S 5/0284* (2013.01)
(58) Field of Classification Search
CPC ......... H04W 64/00; H04W 4/02; H04W 4/33; H04W 4/029; H04W 64/006;
(Continued)

(56) References Cited

U.S. PATENT DOCUMENTS 8,558,666 B2 * 10/2013 Nadkarni .............. G01S 15/876
340/8.1
2019/0104383 A1 * 4/2019 Keal ..................... H04W 4/025
2022/0050211 A1 2/2022 Bennington et al.

FOREIGN PATENT DOCUMENTS

WO 2009/035952 A1 3/2009
WO WO-2014203041 A1 * 12/2014 ............. G01S 13/75
WO 2022/051615 A1 3/2022

OTHER PUBLICATIONS

Jiang, et al., "NLOS Mitigation Method for TDOA Measurement", 2010 Sixth International Conference on Intelligent Information Hiding and Multimedia Signal Processing, pp. 196-199, 2010.

(Continued)

*Primary Examiner* — Olumide Ajibade Akonai
(74) *Attorney, Agent, or Firm* — BakerHostetler

(57) ABSTRACT

A method for locating a mobile node in a given area, using reference nodes, the positions of which are known in the area, includes the following steps of: a) creating a visibility map comprising, for a plurality of cells, a visibility indicator ($l_{ij}$) corresponding to a line-of-sight radio propagation between the cell and the reference node ($N_j$); b) providing a set of ranging measurements on the basis of signals transmitted or received by a plurality of reference nodes ($N_j$); c) computing a coherence score between the position of the cell and the set of ranging measurements, the coherence score being computed on the basis of the visibility indicator ($l_{ij}$) between the cell and the reference node ($N_j$); d) determining the position of the mobile node as a function of the coherence score of each cell.

21 Claims, 4 Drawing Sheets

(58) Field of Classification Search
CPC ....... H04W 4/023; H04W 4/38; H04W 4/025; G01S 5/06; G01S 5/021; G01S 5/0284; G01S 1/026; G01S 5/0218; G01S 5/14; G01S 5/0268; G01S 5/0273; G01S 5/02525

See application file for complete search history.

(56) References Cited

OTHER PUBLICATIONS

Sousa, et al., "Mobile Station Localization Emitter in Urban NLOS using Multipath Ray Tracing Fingerprints and Machine Learning", 2018 8th International Conference on Localization and GNSS (ICL-GNSS), pp. 1-6, 2018.

Hsu, et al., "3D building model-based pedestrian positioning method using GPS/GLONASS/QZSS and its reliability calculation", GPS Solutions, vol. 20, No. 3, pp. 413-428, 2016.

* cited by examiner

METHOD AND SYSTEM FOR LOCATING A MOBILE NODE BY RADIO MEASUREMENTS USING A VISIBILITY MAP

CROSS-REFERENCE TO RELATED APPLICATION

This application claims priority to foreign French patent application No. FR 2205042, filed on May 25, 2022, the disclosure of which is incorporated by reference in its entirety.

FIELD OF THE INVENTION

The invention relates to a method and a system for locating a mobile node in a given area, using known positions of reference nodes.

The technical field of the invention is that of locating on the basis of radio signals. More specifically, it relates to methods using the time of flight of the electromagnetic wave.

BACKGROUND

As illustrated in FIG. 1, existing localization methods involve measuring the time of flight of the signal between reference nodes (A1, A2, A3), the position of which is generally known, and a mobile node TM, the position of which is to be determined.

For example, in an LPWAN (Low Power Wide Area Network), the reference node corresponds to an anchor, i.e., a device with a known and fixed position, and the mobile node corresponds to a "tag". The tag is conventionally fixed to an object so as to transmit telemetry data. In a cellular network, the reference node corresponds to a base station, and the mobile node can be a cellphone. In a satellite radionavigation system, the reference node corresponds to a satellite (its position is known), and the mobile node can be a radionavigation receiver.

Knowing the speed of propagation of the waves, which is equal to the speed of light, it is possible to determine the distance covered by the waves and, therefore, the distance separating the fixed nodes from the mobile node. This is referred to as a "ranging" measurement, which corresponds to the time of flight measurement between two devices, to the corresponding distance measurement, or even to a pseudo-distance.

Therefore, locating a mobile node is a conventional trilateration problem, as illustrated in FIG. 1, the unknowns of which (in this two-dimensional example: x, y) comply with the following equations:

[Math1]:

$$\begin{cases} d_1 = \sqrt{(x-x_{a1})^2 + (y-y_{a1})^2} \\ d_2 = \sqrt{(x-x_{a2})^2 + (y-y_{a2})^2} \\ d_3 = \sqrt{(x-x_{a3})^2 + (y-y_{a3})^2} \end{cases}$$

However, precise measurement of the time of flight requires perfect synchronization of the clocks of the fixed nodes and of the mobile node (with a level of precision typically ranging between 1 ns and 100 ns), with a synchronization error of one nanosecond resulting in a distance measurement error of approximately 30 cm.

However, this precise synchronization generally is not possible, and results in a description of the measurements $m_i$ that includes an additional unknown $\Delta_i$ expressing this synchronization error. In addition, these measurements can be subject to other errors $\varepsilon_i$ caused, for example, by measurement noise and by wave reflections. Generally, the system of equations [Math1] becomes:

[Math2]

$$\begin{cases} m_1 = d_1 + \Delta_1 + \varepsilon_1 \\ m_2 = d_2 + \Delta_2 + \varepsilon_2 \\ m_3 = d_3 + \Delta_3 + \varepsilon_3 \end{cases}$$

Various techniques exist for avoiding the synchronization problem and removing the unknowns $\Delta_i$ expressing this synchronization error.

Depending on the environment in which the wave propagates, said wave can be reflected (referred to as multipath) and/or obstructed. When the wave propagates on a direct path, without reflection, between the transmitter and receiver, then this is referred to as 'Line-of-sight' (LOS) and, otherwise, the term 'Non-Line-of-sight' (NLOS) is used.

This occurs, for example, in urban environments where the buildings can act both as obstacles and/or reflectors for the electromagnetic wave.

FIG. 2 illustrates these different situations.

Reference node A1 is in an LOS situation with no multipath relative to the mobile node TM because it only receives the direct path, with no reflected path. The reference node A2 is in an LOS situation with multipath relative to the mobile node TM because it receives the direct path $t_{2A}$ as well as a reflected path $t_{2B}$. Reference node A3 is in an NLOS situation with multipath relative to the mobile node TM because it does not receive the direct path $t_{3A}$, which is obstructed by the building B1, but it does receive a reflected path $t_{3B}$ reflected by the building B2.

An NLOS situation with no multipath results in non-reception of the signal since it has no path for reaching its destination.

In the depiction of FIG. 2, the measurement carried out by reference node A1 can be considered to be the most reliable because it does not experience any disruption in its propagation. The associated error ($\varepsilon_1$) in this case is mainly determined by the measurement noise, which constitutes a minimum error.

For example, for an LoRa type waveform, the error caused by noise alone is typically of the order of one hundred meters (between 10 m and 300 m).

The measurement carried out by the fixed terminal A2 can be disrupted by the presence of the multipath. The error that is generated depends on the ability of reference node A2 to distinguish the direct path from the reflected path (which will arrive later than the direct path), and on the relative power of the reflected path compared to the direct path. Therefore, this is an intermediate situation.

For example, for an LoRa type waveform, the error caused by the noise and the multipath is highly variable depending on the features of the reflected paths. The errors can vary between a few tens of meters (identical to noise alone) and several kilometers.

The measurement carried out by reference node A3 for its part is highly biased. Indeed, the only signal reaching this reference node has covered a distance corresponding to the path $t_{3B}$, which is significantly greater than the direct path $t_{3A}$; the time of flight therefore reflects this distance and not that of the direct path. This measurement is generally referred to as an artefact (or outlier) because it has an error that can be several orders of magnitude greater than the error due to noise alone.

For example, for an LoRa type radio, the error in an NLOS situation typically ranges from several hundred meters to several kilometers.

The issue with such a situation is that it is very difficult, if not impossible, to determine the reliability of each of the measurements.

In general, it is possible to distinguish between sequential algorithms (which use the previous solutions) and instantaneous approaches ("single epoch", "snapshot"), which are solely based on the measurements received at the time t.

In a sequential approach, the system can predict the possible position at the time t in accordance with the solutions found at previous times t-1, t-2, with an acceptable margin of error (this notion of acceptable margin of error is assessed with respect to the precision of the measurement provided by the noise, for example).

From the predicted position, it is possible to deduce a "predicted measurement" and its associated margin of error, which can be compared with the measurement that has been carried out. If the incoherence between the prediction and the measurement exceeds the computed margin of error (optionally increased by an arbitrary tolerance), the erroneous measurement can be excluded from the computation of the solution, as proposed in the article entitled "NLOS Mitigation Method for TDOA Measurement", H. Jiang, J. Xu and Z. Li, 2010, Sixth International Conference on Intelligent Information Hiding and Multimedia Signal Processing, 2010, pp. 196-199.

The sequential approach is only practicable on the condition that the refresh rate of the measurements is high enough in relation to the speed of movement of the object to be located, in order to draw usable information from a previous estimate, with the information diluting over time.

However, increasing the refresh rate of the measurements leads to an increase in the electrical consumption of the mobile terminal, which is contrary to the operating conditions of low-power networks of the LPWAN type.

The most widespread non-sequential ("single epoch") approaches are generally based on measurement redundancy, i.e., the number of reference nodes (Na) is significantly greater than the number of unknowns (n+1): Na>n+1. In this case, it is possible to construct subsets of measurements, each of which allows a solution to be computed.

The solutions that are acquired can be compared with each other so as to determine which subsets result in coherent solutions, and which subsets result in marginal solutions. Hence, it is generally possible to deduce, by analyzing the composition of the incoherent subsets, the one or more measurements that may be wrong.

These techniques work well when the redundancy is very high (Na>>n+1), but they then result in very large numbers of subsets to be analyzed, which requires high computing power.

Alternatively, the algorithm can be based on knowledge of the environment through a 3D map, in order to predict, for a given position, which measurements are most likely to be biased.

Such maps are currently readily accessible and available for a large number of cities (for example, the OSM Buildings database). Each building is identified by the two-dimensional position of its footprint and by its height.

Some approaches use the maps to simulate the propagation of waves between each possible position of the mobile node and the various reference nodes, using techniques called "ray tracing" in order to determine a map of the biases that will affect each of the measurements for each of the possible positions.

This mapping then can be taken into account by algorithms for correcting the measurements and improving the estimation of the positions; this is referred to as "NLOS-mitigation" (see, for example, the article entitled "Mobile Station Localization Emitter in Urban NLoS using Multipath Ray Tracing Fingerprints and Machine Learning", by M. N. De Sousa and R. S. Thoma, 2018, 8th International Conference on Localization and GNSS (ICL-GNSS), 2018, pp. 1-6).

However, these approaches are, on the one hand, extremely costly in terms of computation time because bias mapping requires simulating a "complete" propagation (considering the possible reflections of the signal), for each position on the map and relative to each reference node, and, on the other hand, are very unreliable because these simulations, however complex, struggle to predict the real propagation, which is even more complex on the scale of a city.

Other approaches use the map to predict what the measurements will be in an NLOS situation.

In particular, patent application WO 2022/051615 A1 envisages, within the context of a communicating vehicle, using a map to detect paths in NLOS situations. The map includes the position of all the reflectors in the environment of the user terminal. The map allows at least one positioning reference signal PRS to be determined, which is propagated over at least one NLOS path.

The position of the user terminal is determined on the basis of the positioning reference signal PRS. Patent application WO 2022/051615 A1 does not describe how knowledge of the LOS/NLOS condition of each of the points on the map is used by the geolocation algorithm.

Patent application WO 2009/035952 A1 discloses a method for determining the position of a mobile terminal, using one of the fixed nodes as a reference node (TDOA type approach, which therefore requires a particular measurement acting as a pivot).

In this document, a first position of the mobile node is determined, without taking into account the map. Based on this first position, the map and the position of the fixed terminals, the LOS/NLOS paths are assessed. The reference node is selected from the LOS nodes. The position of the mobile node is computed by taking into account the LOS/NLOS conditions of the measurements.

However, with such an approach, the assessment of the LOS/NLOS conditions in accordance with the map is not reliable because the considered position of the mobile node is determined by an initial estimate that does not use the knowledge of the LOS/NLOS conditions; it therefore can prove to be highly erroneous. Consequently, propagation conditions are not assessed on the basis of correct positions.

For example, if the considered position is wrong, even if only by ten meters or so, an obstacle may or may not be in the path of the wave, making the assessment incorrect.

Thus, a requirement exists for providing a method for locating a mobile node in a given area, using known positions of reference nodes, which has a high level of precision, yet without affecting the energy consumption of the mobile node.

SUMMARY OF THE INVENTION

The invention aims to overcome the aforementioned disadvantages by proposing a method that is flexible and easy to use.

The aim of the invention is a method for locating a mobile node in a given area, using reference nodes, the positions of which are known in said area, comprising at least one iteration of the steps of:
- a) creating, for each reference node, a visibility map comprising, for a plurality of cells of the visibility map, a visibility indicator corresponding to a line-of-sight radio propagation between the cell and the reference node;
- b) providing a set of ranging measurements on the basis of signals transmitted or received by a plurality of reference nodes;
- c) computing, for each cell of the plurality of cells, a coherence score between the position of the cell and the set of ranging measurements, the coherence score being computed, for each reference node, on the basis of the visibility indicator between the cell and the reference node identified by the ranging measurement; d) determining the position of the mobile node as a function of the coherence score of each cell.

Advantageously, step c) comprises:
- c1) computing, for each ranging measurement and each cell, a confidence index of the ranging measurement at the cell on the basis of the visibility indicator between the cell and the reference node identified by the ranging measurement;
- c2) computing, for each ranging measurement, a normalized residual corresponding to a difference between the ranging measurement and the distance between the cell and the reference node, related to the confidence index;
- c3) computing the coherence score between the position of the cell and the set of ranging measurements, on the basis of the normalized residuals associated with each of the reference nodes.

Advantageously, the visibility indicator has a binary value indicating a situation involving a line-of-sight radio propagation or a situation not involving a line-of-sight radio propagation.

As a variant, the visibility indicator $l_{ij}$ between the cell $P_i$ and the reference node $N_j$ has a continuous value, defined by:

$$l_{ij} = \begin{cases} 1 - \dfrac{b_{int}}{b_{max}} & \text{if } b_{int} < b_{max} \\ 0 & \text{otherwise} \end{cases},$$

where $b_{int}$ corresponds to an obstruction length of a segment between the cell $P_i$ and the reference node $N_j$, and $b_{max}$ corresponds to a predefined maximum length.

Advantageously, the confidence index $\sigma_{ij}$ is computed according to the formula:

$$\sigma_{ij} = \sigma_0 + (1 - l_{ij})\sigma_1,$$

where $l_{ij}$ corresponds to the visibility indicator between the cell $P_i$ and the reference node $N_j$, and $\sigma_0$ and $\sigma_i$ correspond to predetermined values.

Advantageously, the confidence index, for a reference node, is equal to a constant value independently of the visibility indicator if the altitude of a reference node is higher than a predefined altitude.

Advantageously, if a visibility indicator is not available for a cell of the visibility map, the available visibility indicator of the nearest cell is used to compute the confidence index.

Advantageously, in the absence of synchronization between all the reference nodes $N_j$, the normalized residual $\delta_{ij}^N$ is computed according to the formula:

$$\delta_{ij}^N = \frac{m_j - d_{ij} - \Delta_i}{\sigma_{ij}},$$

where $m_j$ corresponds to the ranging measurement, $d_{ij}$ corresponds to the distance between the cell $P_i$ and the reference node $N_j$, $\sigma_{ij}$ corresponds to the confidence index associated with the measurement $m_j$ at the position of the cell $P_i$, and $\Delta_i$ corresponds to a synchronization error value between all the reference nodes $N_j$ for the cell $P_i$.

Advantageously, the synchronization error value $\Delta_i$ for the cell $P_i$ is computed according to the formula:

$$\Delta_i = \left(\frac{1}{\sum_{j=1}^{M} \sigma_{ij}^2}\right) \sum_{j=1}^{M} \frac{m_j - d_{ij}}{\sigma_{ij}^2},$$

where M corresponds to the total number of reference nodes.

Advantageously, the synchronization error value $\Delta_i$ for the cell $P_i$ is determined as a function of an estimate on a previous iteration.

Advantageously, a bias value is associated with at least one cell, the bias value corresponding, for said cell, to a normalized residual that is constant and greater than a predetermined threshold observed for a plurality of previous iterations of the method, and wherein the bias value is subtracted from the ranging measurement during the sub-step c2).

Advantageously, the coherence score $s_i$ is computed according to the formula:

$$s_i = K.\exp\left(-\frac{1}{2}\sum_{j=1}^{M} \delta_{ij}^{N2}\right),$$

where K is a normalization constant.

Advantageously, the coherence score $s_i$ at a time t is also computed as a function of the coherence score $s_i$ at a time t−1.

Advantageously, the position of the mobile node corresponds to the cell for which the coherence score is maximum.

Advantageously, the visibility map is subdivided into a plurality of areas; an average coherence score is computed for each area, on the basis of the average of the coherence scores of the cells in the area; and the position of the mobile node corresponds to the cell for which the coherence score is maximum, in the area with the maximum average coherence score.

Advantageously, steps c) and d) are limited to a portion of the visibility map, with the portion of the visibility map being determined as a function of at least one previous iteration of the method, or as a function of a priori knowledge of the position of the mobile node.

Advantageously, with the visibility map being subdivided into a plurality of areas, step a) is implemented for each of the areas, with an overlap between adjacent areas.

Advantageously, the coherence score is computed for a subset of cells of the visibility map, with the subset being determined according to rough sampling of the visibility map, the coherence score then being computed for the cells located around the cells of the first subset that have the highest score, according to finer sampling.

The invention also relates to a system for locating a mobile node in a given area, using reference nodes, the positions of which are known in said area, the system being configured for a) creating, for each reference node, a visibility map comprising, for a plurality of cells of the visibility map, a visibility indicator corresponding to a line-of-sight radio propagation between the cell and the reference node;

b) providing a set of ranging measurements on the basis of signals transmitted or received by a plurality of reference nodes;

c) computing, for each cell of the plurality of cells, a coherence score between the position of the cell and the set of ranging measurements, the coherence score being computed, for each reference node, on the basis of the visibility indicator between the cell and the reference node identified by the ranging measurement;

d) determining the position of the mobile node as a function of the coherence score of each cell.

Advantageously, the mobile node is a transmitter tag, and the reference nodes are anchors.

As a variant, the mobile node is a radionavigation receiver, and the reference nodes are satellites.

BRIEF DESCRIPTION OF THE DRAWINGS

Further features, details and advantages of the invention will become apparent from reading the description, which is provided with reference to the accompanying drawings, which are provided by way of example.

DETAILED DESCRIPTION

Figure 1:
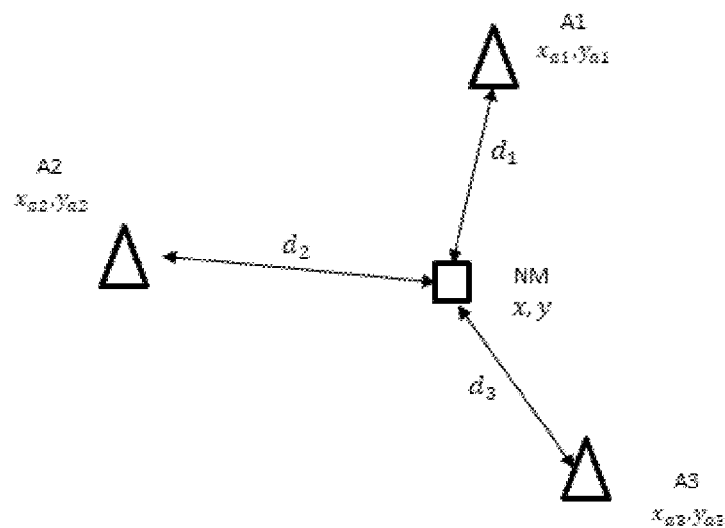
FIG. 1, already described, illustrates the principle of trilateration-based localization.
Figure 2:
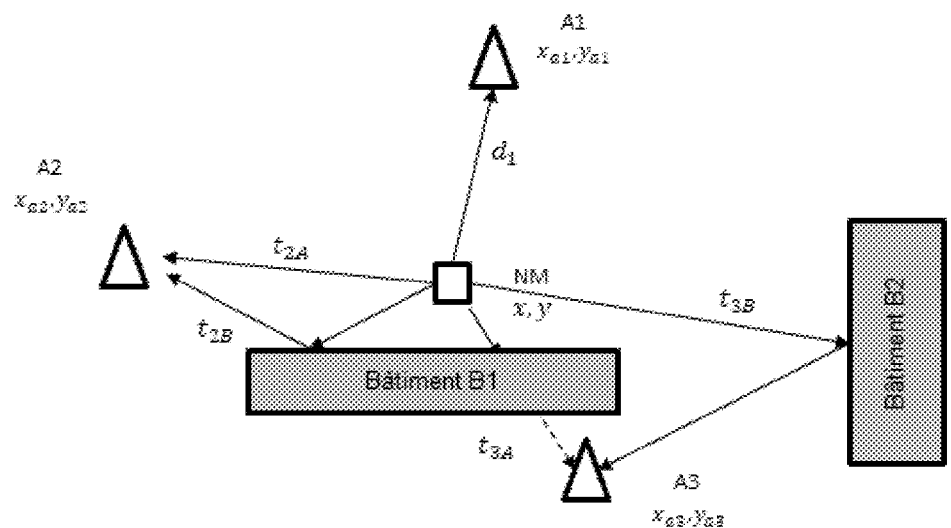
FIG. 2, already described, illustrates multipath and obstruction situations.
Figure 3:
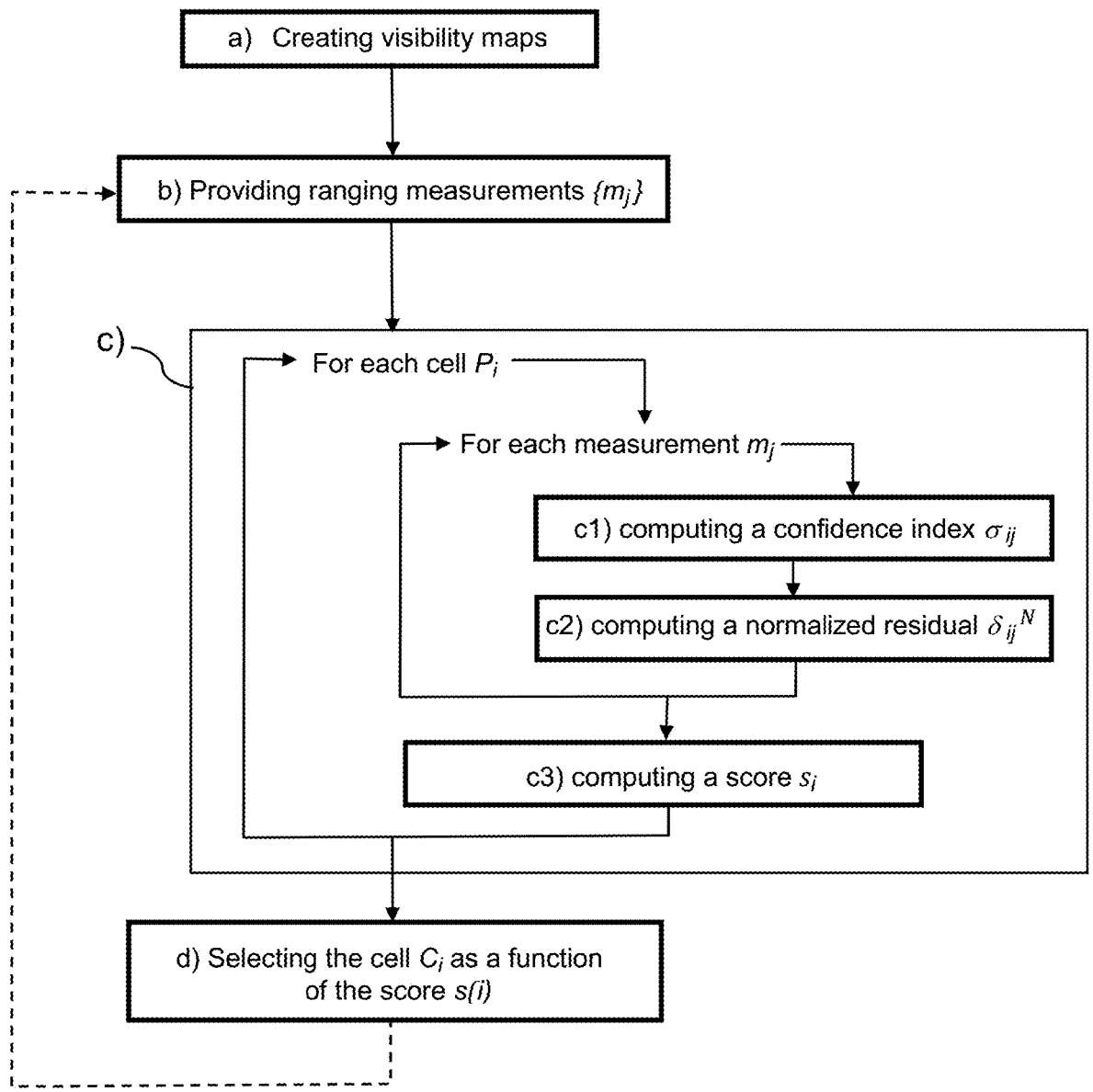
FIG. 3 is a flow chart of the various steps of the method according to the invention.

A flow chart of the various steps of the method is illustrated in FIG. 3.

The first step of the method involves creating a plurality of visibility maps (step a) of the method). The visibility map corresponds to a predefined 2D or 3D space, which is discretized so as to acquire an even or uneven grid of cells, which correspond to as many possible positions of the mobile node for which the position is to be determined.

The method according to the invention uses as many visibility maps $C_j$ as there are reference nodes $N_j$ that can be used for the ranging measurements. The position of each reference node $N_j$ is known in the visibility map $C_j$.

The space delimited by the visibility map is identical for all the visibility maps. It can be, for example, a square with sides several kilometers long. The position of a cell can be defined by 2 coordinates (x, y) in 2D or 3 coordinates (x, y, z) in 3D. These positions can be selected according to a grid, for example, where they are uniformly distributed and separated from each other by a predefined distance, for example, ten meters in both x and y directions (or even in all three directions).

For each cell $P_i$ of the visibility map $C_j$, a visibility indicator $l_{ij}$ is computed that corresponds to a line-of-sight radio propagation between the cell $P_i$ and the reference node $N_j$.

Figure 4:
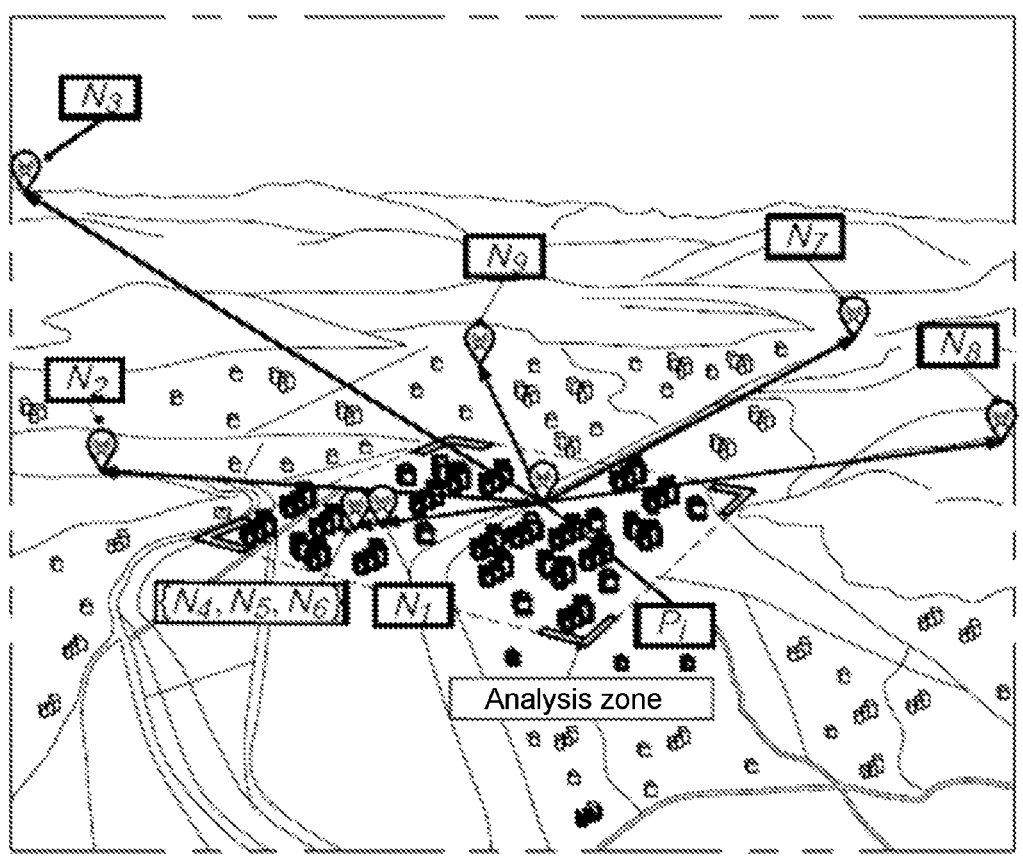
FIG. 4 illustrates an example of a geographical area for which the visibility map is created.

FIG. 4 illustrates an example of a geographical area for which the visibility map is created, using several reference nodes $N_1 \ldots N_9$.

The visibility indicator $l_{ij}$ provides a "Line-of-sight" (LOS) or "Non-Line-of-sight" (NLOS) type of indication between the cell $P_i$ and the reference node $N_j$.

The visibility indicator $l_{ij}$ can be computed by simulation, for example, using Matlab software, having loaded certain terrain mapping data. The data can originate, for example, from the "OpenStreetMap" collaborative project, optionally supplemented with data indicating the height of each building. This data can be acquired from the "OSM Building" library.

Matlab software includes the "Ray Tracing" function, which allows a propagation model to be created between two given cells, while specifying that there must not be any reflection in the propagation path, in order to acquire LOS/NLOS type information. Therefore, a "complete" propagation does not need to be simulated, considering all the possible reflections of the signal.

Any other simulation software allowing LOS/NLOS type information to be acquired between two cells on a map also could be used.

The visibility map also can be determined by field surveys carried out in another context, rather than by simulations.

According to one embodiment, the visibility indicator $l_{ij}$ has a binary value indicating a situation involving a line-of-sight radio propagation or a situation not involving a line-of-sight radio propagation. For example, $l_{ij}=1$ in an LOS situation between the cell $P_i$ and the reference node $N_j$, and $l_{ij}=0$ otherwise. The use of binary values significantly simplifies the subsequent computations for locating the mobile node.

As a variant, the visibility indicator can assume a continuous value ranging between 0 and 1, allowing the level of obstruction to be qualified, and the precision of the localization method to be improved.

Thus, the visibility indicator $l_{ij}$ between the cell $P_i$ and the reference node $N_j$ can be defined by:

$$l_{ij} = \begin{cases} 1 - \dfrac{b_{int}}{b_{max}} & \text{if } b_{int} < b_{max} \\ 0 & \text{otherwise} \end{cases}.$$

Considering the NLOS segment that connects the cell $P_i$ and the reference node $N_j$, the length $b_{int}$ corresponds to the length of the segment that prevents the direct line-of-sight between the cell $P_i$ and the reference node $N_j$. For example, the obstruction can be caused by passing through a building, or the ground in the case of an intersection with the terrain in the event of relief in the terrain. A maximum length $b_{max}$ is predefined, for example, equal to ten meters. If the obstruction portion of the segment is greater than the maximum length $b_{max}$, then it is considered that $l_{ij}=0$. This allows only small obstacles to be taken into account, for example, the edges or the borders of buildings, and thus allows the LOS/NLOS type information to be qualified.

For example, if the segment does not intersect any buildings ($b_{int}=0$), the visibility indicator $l_{ij}$ is equal to 1, as before; if it intersects a building over five meters ($b_{int}=5$), the indicator is equal to 0.5, and if the length is greater than or equal to ten meters ($b_{max}$), then the indicator is equal to 0.

The visibility indicators $l_{ij}$ are computed for all the cells $P_i$ of the visibility map $C_j$, and there are as many visibility maps $C_j$ as there are reference nodes $N_j$ in the considered area. It is possible to consider only some of the reference nodes $N_j$ of the area, notably to reduce the computing cost of the method.

Figure 5:
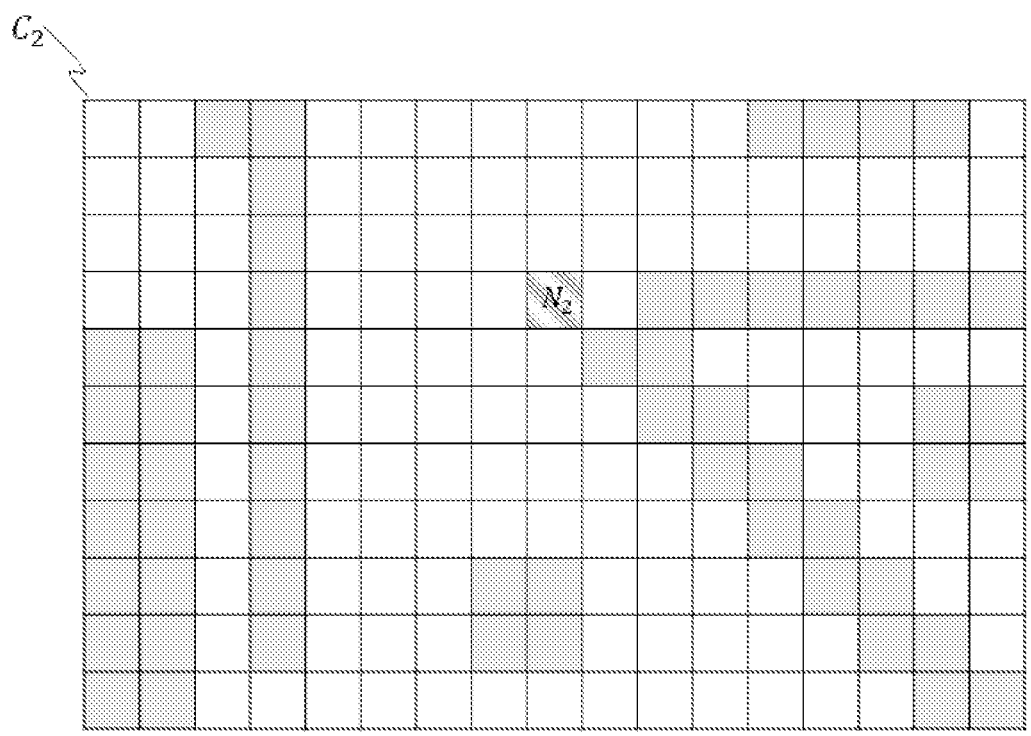
FIG. 5 illustrates an example of a visibility map.

FIG. 5 illustrates a detailed view of the visibility map $C_2$ associated with the reference node $N_2$. The shaded cells are cells for which the visibility indicator $l_{ij}$ is non-zero (LOS situation). The white cells are cells for which the visibility indicator $l_{ij}$ is zero (NLOS situation).

The visibility maps can be computed "off-line", i.e., upstream of the step of locating the mobile node. They can be computed once and once for all; however, it is preferable for them to be computed periodically, and/or when there are changes to the reference nodes (activation of a new reference node or deactivation of a reference node), or even when there are modifications in the given area, which are likely to influence the computations of the visibility indicators (for example, construction of a building, or even moving, adding or removing a reference node).

Creating visibility maps over an extended area can lead to particularly long and intensive simulations.

In order to shorten the time required for creating visibility maps, subdividing each visibility map into a plurality of areas is proposed, step a) is implemented for each of the areas, independently of each other. Only the buildings and other points of relief belonging to the considered area are loaded for processing.

The partial creation of visibility maps can, according to embodiments, be carried out sequentially (each area after the other), or at the same time (all areas at the same time).

An overlap between two adjacent areas can be implemented in order to improve the reliability of the computation of the visibility indicator. Indeed, when the cell $P_i$ is on the border of an area, certain NLOS situations may not be detected since the buildings outside the area are not represented. Adding an overlap (or a margin) ensures that the immediate environment of each point of the map is correctly modelled in all the directions of the space.

Advantageously, an overlap of the order of 25% can be implemented: for an area defined by a 2 km×2 km square an overlap of 500 m can be used, which allows all the buildings to be represented in a neighborhood of at least 500 m.

The method according to the invention then comprises several steps that are carried out "on-line", as they are implemented each time a mobile node needs to be located. The first of these steps (after the visibility maps have been created) involves providing a set of ranging measurements on the basis of signals transmitted or received by a plurality of reference nodes.

The invention is not limited to a particular ranging measurement. Typically, there are several techniques for locating a mobile terminal using ranging measurements.

The first technique, called "Two Way Ranging" (or TWR), assumes that the reference nodes and the mobile node can be both transmitter and receiver nodes. In this case, a transmission in one direction (for example, reference node to mobile node) is followed by a transmission in the other direction (mobile node to reference node). It can be shown that by combining the various measured times of departure and arrival, the synchronization error can be removed for each measurement, which allows a distance to be determined.

A second technique, based on the Time Difference Of Arrival (TDOA), allows a mobile node to be located by carrying out one-way transmissions, i.e., for example, only the mobile node transmits and the reference nodes are for receiving only, or only the reference nodes transmit and the mobile node is for receiving only. It also assumes that the reference nodes are precisely synchronized with each other, i.e., that the unknowns $\Delta_1$, $\Delta_2$ and $\Delta_3$ are identical and reduced to a single value $\Delta$ expressing the synchronization error between all the reference nodes and the mobile node. In this case, computing "secondary measurements" constructed as the difference between the measurements eliminates the unknown $\Delta$ and results in the following system of equations:

$$\begin{cases} m_1 - m_3 = \\ \sqrt{(x-x_{a1})^2+(y-y_{a1})^2} - \sqrt{(x-x_{a3})^2+(y-y_{a3})^2} + \varepsilon_1 - \varepsilon_3 \\ m_2 - m_3 = \\ \sqrt{(x-x_{a2})^2+(y-y_{a2})^2} - \sqrt{(x-x_{a3})^2+(y-y_{a3})^2} + \varepsilon_2 - \varepsilon_3 \end{cases} \quad [\text{Math3}]$$

It should be noted that, for this approach, a measurement (in this case $m_3$) fulfils a particular role and acts as a kind of pivot.

This also implies that a number of measurements that is greater than or equal to n+1 is required, with n being the number of unknowns of the position (two in 2D, three in 3D).

A disadvantage of this technique is that one measurement fulfils a particular role, since it appears in several of the secondary measurements. Indeed, if this measurement has a significant error, this will be reflected in all the secondary measurements. In addition, when the number of measurements is greater than the required minimum number, it is possible, according to random choices, to construct a large number of subsets by selecting different "pivot measurements".

A third technique, called TOA (or Time Of Arrival), is very similar to the TDOA technique, except that, rather than combining the measurements in order to "mathematically" eliminate the synchronization unknown $\Delta_i$, this is added to the list of unknowns to be determined. This technique involves having to have at least n+1 measurements available, yet without the disadvantage of having to arbitrarily determine the subgroups of secondary measurements or to define the pivot measurements. This approach is the one used by all satellite radionavigation receivers (the receiver fulfils the role of the mobile node, and the satellites fulfil the role of the reference nodes).

The invention is presented within the context of the TOA technique, with a transmitter mobile node and receiver reference nodes. A person skilled in the art will know how to adapt the invention to other localization techniques and to other transmission/reception configurations between the mobile node and the reference node.

In the first step, according to one embodiment, a set of measurements M corresponding to the times of arrival (TOA) of the same transmission measured by M reference nodes is therefore considered to be received. These times of arrival typically can have a resolution of a few nanoseconds and are delivered in the form of the decimal portion of the current second. Indeed, the times of arrival measured by the various reference nodes are close enough (differences<<1 ms) for them to belong to the same second.

These measurements can be converted into pseudo-distances by multiplying the time by the speed of light in order to convert the times into meters, resulting in the following equations:

$$\begin{cases} m_1 = c.TOA1 = d_1 + \Delta + \varepsilon_1 \\ m_2 = c.TOA2 = d_2 + \Delta + \varepsilon_2 \\ m_3 = c.TOA3 = d_3 + \Delta + \varepsilon_3 \end{cases}$$

It should be noted that the measurements can be constructed using the various techniques described above, and can be directly in the form of distance if the measurement uses the TWR technique.

The number of measurements received can be less than the number of reference nodes deployed, particularly if some reference nodes do not pick up the signal transmitted by the mobile node, or if they pick it up but with insufficient power.

Once the ranging measurements (or at least some of the ranging measurements) have been acquired, a score will be assigned to each cell, with the score indicating the likelihood that the mobile node is located in the cell.

To this end, according to a first sub-step c1) (see FIG. 3), a confidence index $\sigma_{ij}$ is computed on the basis of the visibility indicator $l_{ij}$ between the cell $P_i$ and the reference node $N_j$ identified by the ranging measurement $m_j$. In the data frame of the ranging measurement $m_j$, or in the set of corresponding frames, the identity of the reference node, the position of which is known, can be easily identified.

By considering a cell $P_i$ on the visibility map $C_j$ associated with the reference node $N_j$, the confidence index $\sigma_{ij}$ associated with an assumed measurement $m_j$ on the cell $P_i$ uses the visibility indicator $l_{ij}$. According to the embodiment in which the visibility indicator $l_{ij}$ has a binary value, the confidence index $\sigma_{ij}$ can be defined as follows:

$$\sigma_{ij} = \begin{cases} \sigma_A & \text{if } l_{ij} = 1 \\ \sigma_B & \text{if } l_{ij} = 0 \end{cases}.$$

More generally, according to the embodiment where the visibility indicator $l_{ij}$ is not necessarily a binary value, and can assume a continuous value ranging between 0 and 1, the confidence index $\sigma_{ij}$ is computed according to the following formula:

$$\sigma_{ij} = \sigma_0 + (1 - l_{ij})\sigma_1,$$

where $\sigma_0$ and $\sigma_1$ correspond to predetermined values, which are identical for all the cells and for all the reference nodes.

For example, it is possible to use a ratio of one to twenty between $\sigma_0$ and $\sigma_1$, in particular the following values: $\sigma_0 = 100$ m and $\sigma_1 = 2000$ m.

The confidence index can also depend on the altitude of the reference node. For example, when the altitude of a reference node is above a certain predefined altitude, the confidence index is equal to a constant value independently of the visibility indicator. Indeed, the reference node is visible irrespective of the position of the cell and its environment. This allows the actual situation to be adhered to as closely as possible (the computed NLOS of the map is not effective and the propagation is closer, in practice, to LOS conditions) and therefore allows the precision of the method to be improved.

According to another embodiment, if no visibility indicator is associated with the considered cell, the available visibility indicator of the closest available cell can be used. Thus, for the computation of the confidence index, it is not essential for the visibility indicator to be available for all the cells of the map.

The second sub-step involves computing a normalized residual $\delta_{ij}^N$, for each cell $P_i$ and for each ranging measurement $m_j$, using the following formula:

$$\delta_{ij}^N = \frac{m_j - d_{ij}}{\sigma_{ij}},$$

where $d_{ij}$ corresponds to the theoretical distance between the cell $P_i$ and the reference node $N_j$;

where $m_j$ corresponds to the ranging measurement of the reference node $N_j$. If the ranging measurement is a time of arrival, or a time difference of arrival, it can be converted into a pseudo-distance by multiplying by the speed of light.

The normalized residual j therefore yields the residual $\delta_{ij} = m_j - d_{ij}$ relative to the expected precision defined by $\sigma_{ij}$, which contains the LOS or NLOS information.

According to one embodiment, the residuals $\delta ij$ that are too large, and, by transposition, the normalized residuals $\delta_{ij}^N$, which have a value greater than a predetermined threshold, can be eliminated for the remainder of the method. Indeed, this involves very strongly biased measurements.

The normalized residual $\delta_{ij}^N$ is therefore acquired by assuming that the mobile node is located in the cell $P_i$, and then by computing the theoretical measurements (for example, the geometric distance) between the position of the cell and the various reference nodes. Finally, the residuals are formed by computing a difference between these theoretical measurements and the actual measurements. Thus, the closer the position considered on the map is to the actual position, the smaller the residual error, and vice versa.

The implementation of the method can envisage firstly computing the confidence index $\sigma_{ij}$, then the residual $m_j - d_{ij}$, or vice versa. Sub-steps c1) and c2) thus can be performed simultaneously.

If the ranging measurements are acquired using the two-way technique, the reference nodes are synchronized with each other; therefore, the only synchronization error to be identified is the synchronization error between the mobile node and the reference node. This synchronization error is eliminated when computing measurement differences, as described above.

If the ranging measurements are acquired using other techniques, for example, TOA or TDOA, used in the LoRa system, the reference nodes are not synchronized with each other. Therefore, the measurements $m_j$ are pseudo-distances, which have a high value (because the transmission time of $m_j$ is not known). Therefore, a synchronization error value needs to be taken into account between all the reference nodes $N_j$ for the cell $P_i$, assuming that the mobile node is located in the cell $P_i$. Thus, the synchronization error is taken into account in the computation of the normalized residual:

$$\delta_{ij}^N = \frac{m_j - d_{ij} - \Delta_i}{\sigma_{ij}}.$$

For each cell $P_i$, the synchronization error, which therefore corresponds to the transmission time of the measurement, can be computed by taking a weighted average of the residuals:

$$\Delta_i = \left(\frac{1}{\sum_{j=1}^M \sigma_{ij}^2}\right) \sum_{j=1}^M \frac{m_j - d_{ij}}{\sigma_{ij}^2},$$

where M corresponds to the total number of reference nodes $N_j$ considered for locating the mobile node.

Thus, the method according to the invention advantageously uses the residual $m_j-d_{ij}$, and the synchronization error is considered to be equal to the weighted average of the residuals. Each residual is weighted by the confidence index $\sigma_{ij}$. A true distance is thus acquired by subtracting the synchronization error value $\Delta_i$ from the residual $m_j-d_{ij}$.

According to one embodiment, the synchronization error $\Delta_i$ can be derived from one or more previous estimates. Indeed, the synchronization error $\Delta_i$ can evolve over time, but the temporal drift of the synchronization error $\Delta_i$, linked to the electronics of the system, can be considered to be relatively slow and is not linked to the movement of the mobile node. This embodiment is notably applicable for carrying out satellite positioning. Determining the synchronization error $\Delta_i$ on the basis of the previous estimates can be carried out using a sliding average, a low-pass filter or even a Kalman filter, for example.

According to another embodiment, the visibility map can include a predetermined bias value for certain cells. The bias value corresponds to a systematic error, i.e., a constant residual observed over time. The bias value can be subtracted during the residual and normalized residual computation step. This considerably improves the precision of the localization. This embodiment is particularly suitable for locating a mobile node on a known path, for example, along a railway line, or on a production line.

In a third sub-step c3), a coherence score $s_i$ is computed for each cell $P_i$. It indicates the coherence between the considered position of the cell and the observed measurements. This indicator can be computed using the following formula:

$$s_i = K.\exp\left(-\frac{1}{2}\sum_{j=1}^M \delta_{ij}^{N2}\right).$$

This formula corresponds to the computation of a likelihood, with K being an optional normalization constant such that, for example, the sum of all the scores is equal to 1. Computing such a score for each position on the map results in a "mapping" of the scores, modelled on the visibility maps, and illustrated in FIG. 6 by way of an example.

Figure 6:
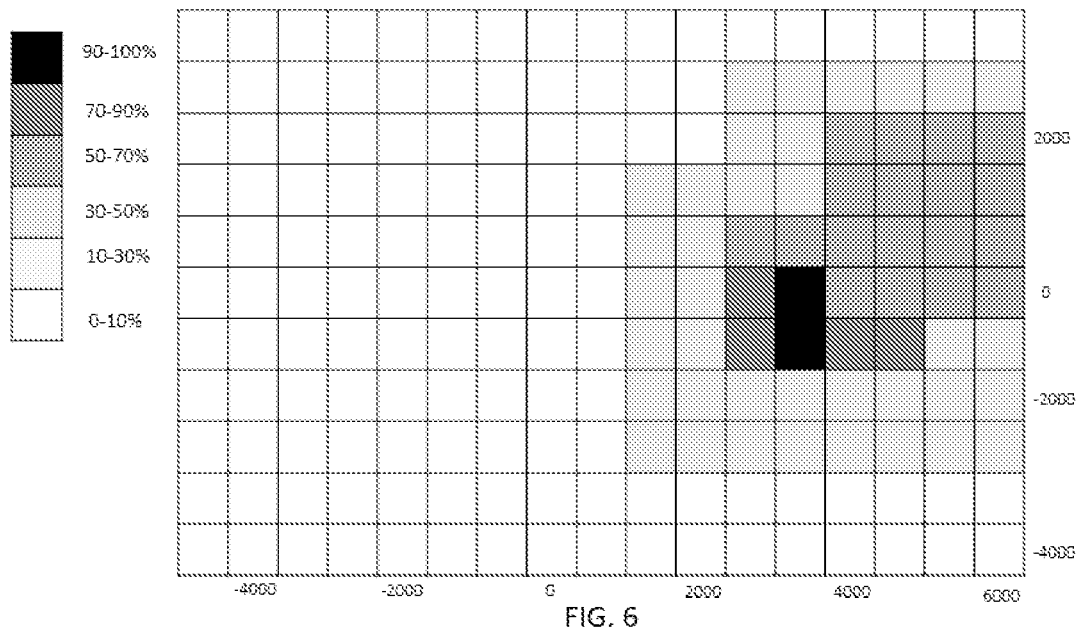
FIG. 6 illustrates an example of a map of the coherence scores.

FIG. 6 therefore illustrates the value of the indicator $s_i$ for each cell $P_i$, on a scale from 0 to 100%. The abscissa and ordinate values correspond, in meters, to the distance from the origin of the graph. The probability of the mobile node being present in a cell is linked to its score. In this case, the mobile node is most likely to be located in a cell with a high score, for example, between 90% and 100%.

Advantageously, the coherence score $s_i$ at a time t can be computed as a function of the coherence score $s_i$ at a time t−1, according to the following formula:

$$s_i(t) = s_i(t-1) * K(t).\exp\left(-\frac{1}{2}\sum_{j=1}^M \delta_{ij}^{N2}\right).$$

This approach allows the instantaneous algorithm to be converted into a sequential algorithm that takes into account the history of measurements and previous solutions. The refresh rate of the measurements is assessed in terms of the speed of movement of the mobile node, notably if it is placed on a mobile carrier. For example, if the mobile node is intended to be carried by a pedestrian, the refresh rate of the measurements of the score will be lower than if the node is intended to be carried by a vehicle. For objects intended to be static, for example, home automation sensors, or external sensors intended to measure environmental data, a daily refresh rate can seem sufficient.

The fourth step of the method (see step d), FIG. 3) involves determining the position of the mobile node NM as a function of the coherence score $s_i$ of each cell $P_i$. The position of the mobile node can be estimated by selecting, for example, the position with the highest score $$\left(P_i = \arg\max_i s_i\right).$$

Cells with a high score have a high probability of the mobile node being located therein.

Other embodiments can be contemplated for determining the position of the mobile node NM.

In particular, the map of the scores, which delimits the same area as the visibility maps, can be subdivided into a plurality of areas, which may or may not be surfaces with an equal area. The areas are not defined a priori and are formed as a function of the scores computed using techniques called "clustering" techniques. An average coherence score is computed for each area, on the basis of the average of the coherence scores of the cells in the area. Finally, the position of the mobile node corresponds to the cell with the highest coherence score, in the area with the highest average coherence score. This embodiment allows any ambiguities to be removed when cells with high scores are very far apart from each other, or if they are located in separate areas.

Instead of using the average coherence score, it would also be possible to use the median score.

As a variant, only cells with a score above a predetermined threshold, and/or only areas with an average score above a predetermined threshold, are taken into account for determining the location of the mobile node.

The maximum a posterior method also can be used to estimate the position of the mobile node from the mapping of the scores.

Until now, the invention has been described by implementing the locating method over the entire sector corresponding to the visibility maps, at all the possible positions of the map. According to one embodiment, if the portion of the map in which the mobile node can a priori be located is known (for example, on the basis of a previous iteration of the method, or by a priori knowledge of the area in which the mobile node is located), the search can be limited to the cells of the portion of the considered map, which allows the computation cost to be reduced.

According to another embodiment, the computation is only carried out for a subset of cells, for example, selected randomly, or selected according to a predefined resolution (for example, one cell in ten, or one cell in a hundred). The results, i.e., the scores, acquired on the basis of this first subset then can be refined by carrying out a second computation on the basis of a second subset of cells, selected, for example, around the cells of the first subset with the highest scores. Therefore, this embodiment involves carrying out a first computation using rough sampling, then a second computation using finer sampling around the cells with a high score. This embodiment allows the number of scores to be computed to be reduced.

The invention is particularly suitable for time-of-flight measurements over relatively large distances (typically greater than 100 meters), which relates to LPWAN (Low Power Wide Area Network) type networks, such as the LoRaWAN network, or even satellite radionavigation systems (GPS, Galileo) or 4G/5G type cellular networks.

The invention also relates to a system capable of implementing the predefined method. The system can be, for example, a satellite positioning system: the mobile node is a radionavigation receiver, and the reference nodes are satellites. The invention also can be implemented in a localization system in which the reference nodes (anchors) operate in transmission mode and the mobile nodes (tags) operate in reception mode. According to another configuration, the reference node can be a receiving anchor of a telemetry system, and the mobile node can be a transmitter terminal.

For cellular localization (for example, according to 4G or 5G standards), the base stations are the reference nodes operating in transmission mode, and the telephones are the mobile nodes operating in reception mode.

The various steps of the method can be carried out by a computing device integrated into one of the reference nodes or the mobile node, or by an external computing device.

The invention claimed is:

1. A method for locating a mobile node (NM) in a given area, using reference nodes, the positions of which are known in said area, comprising at least one iteration of the steps of:
   a) creating, for each reference node ($N_j$), a visibility map ($C_j$) comprising, for a plurality of cells ($P_i$) of the visibility map ($C_j$), a visibility indicator ($l_{ij}$) corresponding to a line-of-sight radio propagation between the cell ($P_i$) and the reference node ($N_j$);
   b) providing a set of ranging measurements ($m_j$) on the basis of signals transmitted or received by a plurality of reference nodes ($N_j$);
   c) computing, for each cell ($P_i$) of the plurality of cells, a coherence score ($s_i$) between the position of the cell ($P_i$) and the set of ranging measurements ($m_j$), the coherence score ($s_i$) being computed, for each reference node ($N_j$), on the basis of the visibility indicator ($l_{ij}$) between the cell ($P_i$) and the reference node ($N_j$) identified by the ranging measurement ($m_j$);
   d) determining the position of the mobile node (NM) as a function of the coherence score ($s_i$) of each cell ($P_i$).

2. The method according to claim 1, wherein step c) comprises:
   c1) computing, for each ranging measurement ($m_j$) and each cell ($P_i$), a confidence index ($\sigma_{ij}$) of the ranging measurement ($m_j$) at the cell ($P_i$) on the basis of the visibility indicator ($l_{ij}$) between the cell ($P_i$) and the reference node ($N_j$) identified by the ranging measurement ($m_j$);
   c2) computing, for each ranging measurement ($m_j$), a normalized residual ($\delta_{ij}^N$) corresponding to a difference between the ranging measurement ($m_j$) and the distance ($d_{ij}$) between the cell ($P_i$) and the reference node ($N_j$), related to the confidence index ($\sigma_{ij}$);
   c3) computing the coherence score ($s_i$) between the position of the cell ($P_i$) and the set of ranging measurements ($m_j$), on the basis of the normalized residuals ($\delta_{ij}^N$) associated with each of the reference nodes ($N_j$).

3. The method according to claim 1, wherein the visibility indicator ($l_{ij}$) has a binary value indicating a situation involving a line-of-sight radio propagation or a situation not involving a line-of-sight radio propagation.

4. The method according to claim 1, wherein the visibility indicator $l_{ij}$ between the cell $P_i$ and the reference node $N_j$ has a continuous value, defined by:

$$l_{ij} = \begin{cases} 1 - \dfrac{b_{int}}{b_{max}} & \text{if } b_{int} < b_{max}, \\ 0 & \text{otherwise} \end{cases}$$

where $b_{int}$ corresponds to an obstruction length of a segment between the cell $P_i$ and the reference node $N_j$, and $b_{max}$ corresponds to a predefined maximum length.

5. The method according to claim 2, wherein the confidence index $\sigma_{ij}$ is computed according to the formula: $\sigma_{ij} = \sigma_0 + (1 - l_{ij})\sigma_1$,
where $l_{ij}$ corresponds to the visibility indicator between the cell $P_i$ and the reference node $N_j$, and $\sigma_0$ and $\sigma_1$ correspond to predetermined values.

6. The method according to claim 2, wherein the confidence index, for a reference node ($N_j$), is equal to a constant value independently of the visibility indicator if the altitude of a reference node ($N_j$) is higher than a predefined altitude.

7. The method according to claim 2, wherein, if a visibility indicator is not available for a cell ($P_i$) of the visibility map ($C_j$), the available visibility indicator ($l_{ij}$) of the nearest cell is used to compute the confidence index ($\sigma_{ij}$).

8. The method according to claim 1, wherein, in the absence of synchronization between all the reference nodes $N_j$, the normalized residual $\delta_{ij}^N$ is computed according to the formula:

$$\delta_{ij}^N = \frac{m_j - d_{ij} - \Delta_i}{\sigma_{ij}},$$

where $m_j$ corresponds to the ranging measurement, $d_{ij}$ corresponds to the distance between the cell $P_i$ and the reference node $N_j$, $\sigma_{ij}$ corresponds to the confidence index associated with the measurement $m_j$ at the position of the cell $P_i$, and $\Delta_i$ corresponds to a synchronization error value between all the reference nodes $N_j$ for the cell $P_i$.

9. The method according to claim 8, wherein the synchronization error value $\Delta_i$ for the cell $P_i$ is computed according to the formula:

$$\Delta_i = \left(\frac{1}{\sum_{j=1}^{M} \sigma_{ij}^2}\right) \sum_{j=1}^{M} \frac{m_j - d_{ij}}{\sigma_{ij}^2},$$

where M corresponds to the total number of reference nodes ($N_j$).

10. The method according to claim 8, wherein the synchronization error value $\Delta_i$ for the cell $P_i$ is determined as a function of an estimate on a previous iteration.

11. The method according to claim 2, wherein a bias value is associated with at least one cell, the bias value corresponding, for said cell, to a normalized residual ($\delta_{ij}^N$) that is constant and greater than a predetermined threshold observed for a plurality of previous iterations of the method, and wherein the bias value is subtracted from the ranging measurement ($m_j$) during the sub-step c2).

12. The method according to claim 2, wherein the coherence score $s_i$ is computed according to the formula:

$$s_i = K.\exp\left(-\frac{1}{2}\sum_{j=1}^{M}\delta_{ij}^{N2}\right),$$

where K is a normalization constant.

13. The method according to claim 1, wherein the coherence score $s_i$ at a time t is also computed as a function of the coherence score $s_i$ at a time t−1.

14. The method according to claim 1, wherein the position of the mobile node (NM) corresponds to the cell ($P_i$) for which the coherence score ($s_i$) is maximum.

15. The method according to claim 1, wherein
the visibility map ($C_j$) is subdivided into a plurality of areas;
an average coherence score is computed for each area, on the basis of the average of the coherence scores of the cells in the area;
the position of the mobile node (NM) corresponds to the cell ($P_i$) for which the coherence score ($s_i$) is maximum, in the area with the maximum average coherence score.

16. The method according to claim 1, wherein steps c) and d) are limited to a portion of the visibility map ($C_j$), with the portion of the visibility map ($C_j$) being determined as a function of at least one previous iteration of the method, or as a function of a priori knowledge of the position of the mobile node (NM).

17. The method according to claim 1, wherein, with the visibility map being subdivided into a plurality of areas, step a) is implemented for each of the areas, with an overlap between adjacent areas.

18. The method according to claim 1, wherein the coherence score ($s_i$) is computed for a subset of cells ($P_i$) of the visibility map ($C_j$), with the subset being determined according to rough sampling of the visibility map ($C_j$), the coherence score ($s_i$) then being computed for the cells located around the cells of the first subset that have the highest score, according to finer sampling.

19. A system for locating a mobile node (NM) in a given area, using reference nodes, the positions of which are known in said area, the system being configured for:
a) creating, for each reference node ($N_j$), a visibility map ($C_j$) comprising, for a plurality of cells ($P_i$) of the visibility map ($C_j$), a visibility indicator ($l_{ij}$) corresponding to a line-of-sight radio propagation between the cell ($P_i$) and the reference node ($N_j$);
b) providing a set of ranging measurements ($m_j$) on the basis of signals transmitted or received by a plurality of reference nodes ($N_j$);
c) computing, for each cell ($P_i$) of the plurality of cells, a coherence score ($s_i$) between the position of the cell ($P_i$) and the set of ranging measurements ($m_j$), the coherence score ($s_i$) being computed, for each reference node ($N_j$), on the basis of the visibility indicator ($l_{ij}$) between the cell ($P_i$) and the reference node ($N_j$) identified by the ranging measurement ($m_j$);
d) determining the position of the mobile node (NM) as a function of the coherence score ($s_i$) of each cell ($P_i$).

20. The system according to claim 19, wherein the mobile node (NM) is a transmitter tag, and the reference nodes ($N_j$) are anchors.

21. The system according to claim 19, wherein the mobile node (NM) is a radionavigation receiver, and the reference nodes ($N_j$) are satellites.

* * * * *